Patented May 12, 1942

2,282,499

UNITED STATES PATENT OFFICE 2,282,499

DEPOLYMERIZATION OF HIGH BOILING UNSATURATED HYDROCARBONS

Karl Smeykal and Kurt Reisinger, Leuna, Germany, assignors, by mesne assignments, to William E. Currie, New York, N. Y.

No Drawing. Application September 1, 1938, Serial No. 227,988. In Germany September 7, 1937

3 Claims. (Cl. 260—683)

The present invention relates to the depolymerization of high boiling unsaturated hydrocarbons.

It has already been proposed to react low molecular, in particular gaseous, olefines under suitable conditions in the presence of polymerizing catalysts, as for example acids, such as sulphuric acid or phosphoric acid, or inorganic halides, such as aluminum chloride, aluminum fluoride or boron fluoride or also substances having a large superficial area, such as bleaching earths, to form higher molecular unsaturated hydrocarbons. The reaction products thus formed usually contain not only dimers but also considerable amounts of trimers, tetrimers and higher polymers of the olefines used. For the compounds polymerized beyond the dimeric stage, however, there are not always suitable possibilities of use, so that they are frequently undesirable by-products. In order to render them valuable it has been proposed to split them up again into lower molecular olefines, in particular to dimers and monomers, by leading them at elevated temperatures over suitable catalysts, as for example bleaching earths, such as fuller's earth or the bleaching earth known under the trade name "Tonsil." The catalysts used, however, very soon become inactive so that the depolymerization rapidly subsides. Even by slowly raising the reaction temperatures, the activity of the catalysts used cannot be retained appreciably longer, and at the higher temperatures they readily clog up by carbon deposition.

We have now found that the catalysts used for the depolymerization of polymeric olefines can be kept active for very long periods by carrying out the depolymerization in the presence of appreciable amounts of steam. For this purpose the overpolymerized olefines are led advantageously in the vapor phase together with steam at elevated temperature over the depolymerizing catalysts, the resulting products then being condensed. The steam is usually employed in amounts of more than 20 per cent and not more than 80 per cent and preferably amounts of from 40 to 60 per cent by volume with reference to the vaporized olefine polymers. The reaction is usually carried out at atmospheric pressure, but reduced or increased pressures may be used. The reaction temperatures usually lie between 200° and 400° C.; it is preferable to work between 230° and 300° C.

As depolymerizing catalysts there may be mentioned in particular surface-active substances, as for example bleached earths, which if desired may be subjected to a pretreatment with acids, such as hydrofluoric acid or hydrochloric acid.

As initial materials there may be mentioned in particular those olefine polymerization products, especially those boiling above 170° C., of which the monomeric components boil below 100° C., as for example tri-isobutylene, tetra-isobutylene and higher polymers of isobutylene or the corresponding polymers of isohexylene, and also higher polymers of propylene or the amylenes, hexylenes and heptylenes.

By the presence of the steam, the life of the catalysts may be prolonged without trouble to four to eight or more times that in the absence of steam.

Furthermore, in spite of the shortening of the times of contact in the catalyst chamber with the same throughput of the polymers by reason of the supply of steam, there is not, as would have been expected, a decrease in the degree of reaction, but surprisingly there is even an increase in the same as compared with working without the steam.

The said method of working may be used for splitting up polymers formed by processes other than the preparation of olefine dimers, for example when the compounds which have not been sufficiently polymerized in the preparation of highly polymerized compounds are to be split up for fresh polymerization.

The following examples will further illustrate how the said invention may be carried out in practice, but the invention is not restricted to these examples. The percentages are by volume. The parts are by weight.

*Example 1*

Tri-isobutylene (obtained as a by-product in the preparation of di-isobutylene by the treatment of isobutylene with acids, such as phosphoric acid, sulphuric acid or other catalysts) is vaporized and mixed with steam in such amounts that a mixture of 58 per cent of tri-isobutylene vapor and 42 per cent of steam is formed. This mixture is led at 230° C. over a catalyst consisting of the bleaching earth known under the trade name "Tonsil" pressed into pieces, the throughput being such that half a unit of liquid tri-isobutylene is used per hour for each unit of catalyst volume. The effluent vapors are led through a stripper, condensed in strongly cooled vessels attached thereto and then separated from water.

100 parts of tri-isobutylene are thus split up into 35 parts of isobutylene and 30 parts of di-isobutylene. The remainder is unchanged. After 39 days, the activity of the catalyst is retained to such an extent that under the same working conditions 100 parts of tri-isobutylene are split up into 30 parts of isobutylene and 22 parts of di-isobutylene.

When working without the addition of steam, but under otherwise identical conditions, 100 parts of tri-isobutylene are at first split up into 18 parts of isobutylene and 29 parts of di-isobutylene (the remainder being unchanged tri-isobutylene), but the catalyst becomes entirely inactive after operation for 6 days.

Example 2

A mixture of about 26 per cent of steam and about 74 per cent of di-isoheptylene vapor is led over a bleaching earth known in trade as "Frankonit H" at 230° C., the hourly throughput of di-isoheptylene measured as liquid being about 0.6 times the catalyst volume (volume of the reaction space filled by the catalyst).

Of 100 parts of di-isoheptylene, 70 parts are split up into 49 parts of isoheptylene and 21 parts of a fraction boiling between 100° and 180° C. The remainder (30 parts) of the reaction product consists of non-split di-isoheptylene.

Example 3

A vapor mixture consisting of about 37 per cent of steam and 63 per cent of tetra-isobutylene, is led at 230° C. over bleaching earth known as "Frankonit H," the throughput of tetra-isobutylene measured as liquid per hour being about 0.6 times the catalyst volume.

Of 100 parts of tetra-isobutylene, 60 parts are split into 17 parts of isobutylene, 32 parts of di-isobutylene and 11 parts of tri-isobutylene. The remainder of the reaction product (40 parts) is unchanged tetra-isobutylene.

What we claim is:

1. In the process of depolymerizing polymers of low boiling olefines by passing said olefine polymers at an elevated temperature over a surface active clay catalyst in which the clay itself is the effective catalytic component, the improvement which comprises effecting such depolymerization in the presence of an appreciable amount of steam which operates on the clay itself to maintain the catalytic activity thereof.

2. In the process as claimed in claim 1, operating at a temperature between 200° and 400° C.

3. In the process as claimed in claim 1, passing the polymer together with at least 20 per cent by volume of steam over the depolymerizing catalyst.

KARL SMEYKAL.
KURT REISINGER.